United States Patent
Sato et al.

(10) Patent No.: US 7,860,302 B2
(45) Date of Patent: Dec. 28, 2010

(54) IMAGE PROCESSING APPARATUS

(75) Inventors: Hirokazu Sato, Tokyo (JP); Nobuyuki Fukaya, Tokyo (JP); Mitsuharu Yamada, Tokyo (JP); Tetsuji Anai, Tokyo (JP); Nobuo Kochi, Tokyo (JP)

(73) Assignee: Kabushiki Kaisha Topcon (JP)

(*) Notice: Subject to any disclaimer, the term of this patent is extended or adjusted under 35 U.S.C. 154(b) by 28 days.

(21) Appl. No.: 12/339,780

(22) Filed: Dec. 19, 2008

(65) Prior Publication Data

US 2009/0161946 A1     Jun. 25, 2009

(30) Foreign Application Priority Data

Dec. 21, 2007   (JP) ............... 2007-330995

(51) Int. Cl.
*G06K 9/00*   (2006.01)
*G03B 17/00*  (2006.01)

(52) U.S. Cl. ............... 382/154; 382/291; 396/55

(58) Field of Classification Search ........ 382/100, 382/103, 104, 106, 107, 154, 168, 190–194, 382/199, 209, 232, 254, 274, 276, 286, 291–295, 382/305, 312; 348/218.1, 129; 396/55
See application file for complete search history.

(56) References Cited

U.S. PATENT DOCUMENTS

| | | | | |
|---|---|---|---|---|
| 6,047,134 A * | 4/2000 | Sekine et al. | ........... | 396/55 |
| 6,961,446 B2 * | 11/2005 | Imagawa et al. | ........... | 382/103 |
| 7,010,157 B2 * | 3/2006 | Kochi et al. | ........... | 382/154 |
| 7,126,630 B1 * | 10/2006 | Lee et al. | ........... | 348/218.1 |
| 7,181,081 B2 * | 2/2007 | Sandrew | ........... | 382/254 |
| 2001/0045980 A1 * | 11/2001 | Leonard | ........... | 348/129 |
| 2007/0065004 A1 | 3/2007 | Kochi et al. | | |
| 2007/0236561 A1 | 10/2007 | Anai et al. | | |

FOREIGN PATENT DOCUMENTS

| | | |
|---|---|---|
| EP | 1750090 A2 | 2/2007 |
| EP | 1750090 A2 * | 7/2007 |
| EP | 1843292 A1 * | 10/2007 |
| JP | 10-191279 A | 7/1998 |
| JP | 2005-332177 A | 12/2005 |

OTHER PUBLICATIONS

Gibson, Simon et al., "Accurate Camera Calibration for Off-line, Video-Based Augmented Reality", Proceedings of the International Symposium on Mixed and Augmented Reality (ISMAR'02), IEEE, 2002, pp. 1-10.

(Continued)

*Primary Examiner*—Seyed Azarian
(74) *Attorney, Agent, or Firm*—Brinks Hofer Gilson & Lione

(57) ABSTRACT

An image processing apparatus comprises an inputting section for inputting a plurality of continuous images which were photographed by a photographing section progressively moving relative to a photographed object; an extracting section for extracting characteristic points from images input by the inputting section; a tracking section for tracking the points corresponding to the characteristic points in the plurality of continuous images; an embedding section for embedding tracking data, which includes data of extracted and tracked points by the extracting section and the tracking section, into each image; and an outputting section for outputting the plurality of continuous images sequentially in which the tracking data was embedded by the embedding section.

20 Claims, 10 Drawing Sheets

OTHER PUBLICATIONS

Nistér, David et al., "Visual Odometry", Proceedings of the 2004 IEEE Computer Society Conference on Computer Vision and Pattern Recognition (CVRP'04), IEEE, 2004, 8 pages.

Extended European Search Report for counterpart European Application No. 08022299.5, dated Feb. 10, 2010, 6 pages.

* cited by examiner

PASS POINTS

Fig. 11A

| FRAME NUMBER | | INTERLACE OR PROGRESSIVE | | TEMPLATE COLOR | |
|---|---|---|---|---|---|
| PROCESS STATUS | NUMBER OF GENERATIONS | TOTAL NUMBER OF POINTS | | POINT ARRANGEMENT STATISTIC | |
| THRESHOLD OF EVALUATION VALUE | | THRESHOLD OF MOVING DISTANCE | | THRESHOLD OF NUMBER OF CHRACTERISTIC POINTS | |
| THRESHOLD OF NUMBER OF POINTS SUCCEEDED TO NEXT GENERATION | | GPS INFORMATION | STANDARD TIME | ATTEITUDE INFORMATION | |

| POINT NUMBER | X AND Y COORDINATES | GENERATION NUMBER | NUMBER OF SUCCEEDED TIMES | EVALUATION VALUE OF A TEMPLATE MATCHING | POINT STATUS |
|---|---|---|---|---|---|
| POINT NUMBER | X AND Y COORDINATES | GENERATION NUMBER | NUMBER OF SUCCEEDED TIMES | EVALUATION VALUE OF A TEMPLATE MATCHING | POINT STATUS |

| 5 | | INTERLACE | | RED | |
|---|---|---|---|---|---|
| EXTRACTING | 3 | 7 | | (−30, −120) | |
| 10 | | 10pix | | 6 | |
| 3 | | N40°5 E135°3 | 13:25:08 | X20° Y0° Z45° | |

| 1 | (450, 630) | 3 | 0 | 0 | ALIVE |
|---|---|---|---|---|---|
| 3 | (10, 180) | 1 | 2 | 10 | ALIVE |

．
．
．
．

IMAGE PROCESSING APPARATUS

RELATED APPLICATIONS

This application claims priority under 35 U.S.C. §119 to Japanese Patent Application No. JP2007-330995 filed on Dec. 21, 2007, the entire content of which is hereby incorporated by reference.

BACKGROUND

1. Field of the Invention

The present invention relates to an image processing apparatus which carries out photogrammetry based on a plurality of continuous images obtained from a moving image, and in particular, relates to an image processing apparatus that can easily and effectively manage various data required for orientation processing.

2. Description of the Related Art

The theory of photogrammetry has been researched for a long time, and in particular, the theory has been widely used in the field of the civil engineering. This photogrammetry is a technique for determining three-dimensional information of a photographed object from stereo-pair images photographed from two directions. A summary of photogrammetry will be explained hereinafter.

First, the photographed object is photographed from two directions by a camera. As a result, stereo-pair images consisting of right and left images are obtained. The worker determines 6 points (control points) corresponding between right and left images, and obtains these coordinate values on each image. Then, relative orientation is carried out by using the coordinates values of these 6 points. The relative orientation is a method for calculating relative coordinates and three-axial rotary angles of a camera photographing right and left images. The scales and tilts of right and left images are unified by the relative orientation, and stereo model (stereo images) in which vertical parallax is removed can be made (refer to FIG. 2). These stereo images are equivalent to right and left images obtained by a stereovision imaging system in which optical axes of two cameras are parallel to each other.

Furthermore, when the number of common points corresponding between multiple stereo-pair images is 3 points or more, connective orientation is possible. This connective orientation is a method for converting into the same coordinate system by unifying tilts and scales between stereo models. The connective orientation is carried out by fixing orientation elements of one image and manipulating orientation elements of the other image. Then, the three-dimensional coordinates of each point can be measured by the principle of triangulation (stereo method) from each model obtained by the connective orientation. Details of this stereo method, the relative orientation, and the connective orientation are described later. Furthermore, inner orientation is required according to the lens of the camera. The inner orientation is a method for calculating a focal length of lens and correction factors for correcting lens distortion.

In recent years, a technique for automating setting work of control points in photogrammetry by an image processing has been proposed (for example, see Japanese Unexamined Patent Application Publication No. 2005-332177). According to a technique described in JPA 2005-332177, first, an object is photographed as a moving image, while its photographed position progressively changes. Then, characteristic points are extracted in the first frame of the moving image data, and the characteristic points are set as control points. The control points are tracked in each frame of the moving image data, and control points in each frame are set. Then, two frames having control points are selected as stereo-pair images, and the above-mentioned photogrammetry analysis is carried out.

On the other hand, an invention described in Japanese Unexamined Patent Application Publication No. 10-191279 is a technique of an embedding system for embedding any data into a moving image. This system comprises a transmitter-side computer which overwrites any embedded data on a partial image at a different position between a plurality of continuous images and which transmits the plurality of continuous images, and further comprises a receiver-side computer which receives the plurality of continuous images and which overwrites a partial image at the same position in previous image on a position embedded an embedded data in each image. As a result, the moving image, and information related to the moving image, can be transmitted and received by a plurality of computers without lowering transmission performance.

SUMMARY OF THE INVENTION

The above-mentioned processes for extracting and tracking characteristic points from the moving image require management of various data such as coordinate data of extracted and tracked points, point numbers, evaluation values of template matching, dead or alive flags of each point, with relation to each image. When the number of the tracked points is fewer than 6 points, extraction of characteristic points is required again. In this case, the relative orientation is impossible between a frame group before extracting characteristic points again and a frame group after extracted characteristic points again, so generation management of these frame groups is required. In addition, when the number of the tracked points is 3 points or more, the connective orientation is possible between generations. Therefore, management of the number of the points succeeded between generations is also required. Thus, to relate various data with a large amount of frame images is not easy.

The invention described in the above-mentioned JPA 10-191279 is a technique for embedding information (embedded data) relating to the moving image into each image. The pixel data in an embedded part is replaced with the pixel data at the same coordinates in the previous image. As a result, the point coordinates in the replaced partial image is the same coordinates as in the previous image. Therefore, such an embedding technique cannot be used in the field of photogrammetry, and does not suggest that the technique can be used in the field of photogrammetry.

In consideration of such problems, an object of the present invention is to provide a technique that can easily and effectively manage various data required for orientation processing in an image processing apparatus that carries out photogrammetry based on a plurality of continuous images obtained from a moving image.

An image processing apparatus comprises an inputting section for inputting a plurality of continuous images which were photographed by a photographing section moving progressively relative to a photographed object; an extracting section for extracting characteristic points from images input by the inputting section; a tracking section for tracking the points corresponding to the characteristic points in the plurality of continuous images; an embedding section for embedding tracking data, which includes data of extracted and tracked points by the extracting section and the tracking section, into each image; and an outputting section for outputting the plurality of continuous images sequentially in which the tracking data was embedded by the embedding section.

In the present invention, "data of extracted and tracked points" is data including point numbers for identifying each point, and X and Y coordinates of points in an image. Furthermore, "a tracking data, which includes data of extracted and tracked points" is data required for carrying out orientation processing. For example, the tracking data is frame numbers, default values (a setting value of the screen, a threshold value for extracting characteristic points, various threshold values for tracking characteristic points, a threshold value for the number of characteristic points in a frame, etc), etc. Such tracking data is composed of many kinds of data, and is closely related to each image. The embedding section embeds this tracking data into each image, so the tracking data and the frame image can be managed easily when orientation processing is carried out. Furthermore, the image processing apparatus in the present invention outputs images in which are embedded the tracking data, so the image processing apparatus only has to have an outputting interface which outputs images, and is not required to have a special interface for outputting the tracking data. Therefore, in the image processing apparatus of the present invention, the number of parts used for the image processing apparatus is few, and a transfer speed transmitting data required for orientation processing is fast.

In a second aspect of the present invention, the tracking section tracks the points corresponding to the characteristic points by using a template matching, and the embedding section embeds an evaluation value of the template matching into each image. According to the second aspect, the embedding section embeds an evaluation value of a template matching into each image, so control points (tie points or pass points) can be selected by superiority or inferiority of the evaluation value, when determining the relative orientation or the connective orientation. Therefore, accuracy of these orientations improves.

In a third aspect of the present invention, when the number of points tracked by the tracking section is less than a predetermined number, the extracting section extracts characteristic points again, and the embedding section embeds the number of extracting times as the number of generations into each image. In the third aspect, the generation, in other words, is a continuous image group of stereo-pair images. The embedding section embeds the number of this generations into each image, so stereo-pair images can be obtained by only selecting two images in which the number of generations is equal, when the relative orientation is carried out.

In a fourth aspect of the present invention, the characteristic points extracted by the extracting section are tracked in the plurality of continuous images, so the characteristic points are succeeded to a next generation, and the embedding section embeds the number of succeeded times into each image. In the fourth aspect, the points succeeded to a next generation can be used for connective orientation. The embedding section embeds the number of succeeded times into each image, so the points in which the number of succeeded times is one or more can be used as tie points in connective orientation.

In a fifth aspect of the present invention, the embedding section embeds the total number of points extracted and tracked by the extracting section and the tracking section in each image. In the fifth aspect, the total number of points in an image is a basis for determining whether points usable as control points are many or few. Therefore, the embedding section embeds the total number of points, so images used for the relative orientation can be selected by the total number of points in an image.

In a sixth aspect of the present invention, the embedding section embeds a point arrangement statistic of extracted and tracked points by the extracting section and the tracking section in each image. In the sixth aspect, bias of point arrangement in each image has an influence on whether a calculation of the relative orientation converges. Therefore, the embedding section embeds a point arrangement statistic into each image, so images in which the bias of point arrangement is small can be selected by the point arrangement statistic, when the relative orientation is carried out.

In a seventh aspect of the present invention, the image processing apparatus further comprises a GPS receiver for getting a position information of the photographing section, wherein the embedding section embeds the position information obtained from the GPS receiver into an image. According to the seventh aspect, the embedding section embeds absolute coordinates of the photographing section obtained from the GPS receiver into an image, so a relative coordinate system can be converted into an absolute coordinate system by the absolute coordinates of the photographing section, when the relative orientation or the connective orientation is carried out.

In a eighth aspect of the present invention, the image processing apparatus further comprises an attitude sensor for detecting an attitude information of the photographing section, wherein the embedding section embeds the attitude information obtained from the attitude sensor into an image. In the eighth aspect, when an optical axis of the photographing section was regulated with the Z-axis, the attitude sensor is a sensor for calculating rotation angles of three-axes which consists of this Z-axis, the X-axis, which is made orthogonal to this Z-axis, and the Y-axis, which is made orthogonal to these axes. According to the eighth aspect, the embedding section embeds the attitude information obtained from the attitude sensor into an image, so three-dimensional measurement is possible by this attitude information, when the calculation of the relative orientation did not converge. In addition, in a case in which the photographing section suddenly shakes during photographing, the shaking condition can be detected by the attitude information embedded in an image. Therefore, it is possible to decide not to use shaken images for the measurement.

In a ninth aspect of the present invention, the embedding section embeds the tracking data into a header area of each image. According to the ninth aspect, the embedding section embeds the tracking data into a header area of an image, so the reading time of the tracking data is shortened.

In a tenth aspect of the present invention, the embedding section embeds the tracking data into a manual setting area of each image, and the manual setting area is set on a screen manually. According to the tenth aspect, when a non-used area in an image is known beforehand, the moving image in which is embedded the tracking data can be used as reusable data by setting the non-used area as the manual setting area.

In a eleventh aspect of the present invention, the embedding section embeds the tracking data into an auto setting area of each image, and the auto setting area is set based on the point arrangement statistic. According to the eleventh aspect, the embedding section embeds the tracking data into a non-used area in an image automatically by the point arrangement statistic, so the moving image in which is embedded the tracking data can be used as reusable data.

In a twelfth aspect of the present invention, the image processing apparatus further comprises an inputting section for inputting the plurality of continuous images sequentially in which the tracking data was embedded; a relative orientation section for performing relative orientation to stereo-pair images selected by the tracking data in the images input from the inputting section; a connective orientation section for connecting a coordinate system between stereo-pair images and other images; and a three-dimensional measuring section for measuring three-dimensional coordinates of points included in the tracking data in the coordinate system connected by the connective orientation section. According to the twelfth aspect, the image processing apparatus inputting the images in which are embedded the tracking data can manage the tracking data and images easily. Furthermore, the relative orientation section and the connective orientation section can select suitable images by the tracking data.

In a thirteenth aspect of the present invention, the image processing apparatus further comprises a single photo orientation section for orientating a relationship between image coordinates of points included in the tracking data and three-dimensional coordinates of the points by using a collinear conditional formula or Direct Linear Transformation (DLT) method to a single image input by the inputting section. In the thirteenth aspect, a single photo orientation section can obtain three-dimensional coordinates of points included in the tracking data embedded in a single image in which the relative orientation section did not use as stereo-pair images, and can obtain a position and an attitude of the photographing section which photographed the single image. The collinear conditional formula is a formula showing a relationship between image coordinates and three-dimensional coordinates of a photographed object by using a condition in which a projection center, a photo image, and a photographed object on the ground are on one straight line. The DLT method is a method approximating a relationship between image coordinates and three-dimensional coordinates of the photographed object by using a third-order projective transformation formula.

According to the present invention, in the image processing apparatus carrying out photogrammetry based on a plurality of continuous images obtained from a moving image, various data required for orientation processing can be managed easily and effectively.

BRIEF DESCRIPTION OF THE DRAWINGS

FIGS. 11A and 11B are diagrams showing a data structure of a tracking data.

DETAILED DESCRIPTION OF THE PREFERRED EMBODIMENTS

1) Principle of Stereo Method

Figure 1:
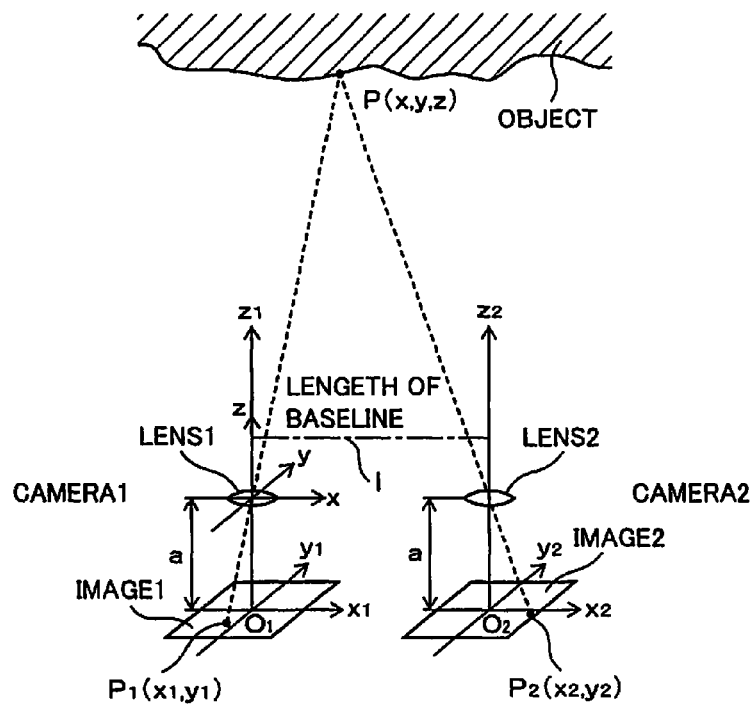
FIG. 1 is an explanatory diagram for explaining a principle of the stereo method.

A basic principle of stereo image measurement in the present invention will be described hereinafter. First, the principle of the stereo method is explained. FIG. 1 is an explanatory diagram for explaining a principle of the stereo method. As shown in FIG. 1, two cameras 1 and 2 are placed with their optical axes parallel to each other, with the lenses 1 and 2 at an equal distance (a) from a principal point to a Charge Coupled Device (CCD) plane, which is the photographing plane, and with the CCD at right angles to the optical axes. The distance between the two optical axes (length of baseline), which equals the distance between the cameras 1 and 2, is assumed to be 1. In this case, the coordinates of a point P(x, y, z) on a photographed object, a point P1(x1, y1) on an image 1, and a point P2(x2, y2) on an image 2 have in the following relationships:

$$x1 = ax/z \tag{1}$$

$$y1 = y2 = ay/z \tag{2}$$

$$x1 - x2 = a1/z \tag{3}$$

The origin of all the coordinate systems is assumed to be at the principal point of the lens 1 of the camera 1. The z is obtained by the formula (3), and x and y are obtained by formulas (1) and (2). As a result, if the corresponding points of the right and left images are obtained, three-dimensional coordinates of the positions can be measured.

2) Principle of Creating Stereo Images

Figure 2A:
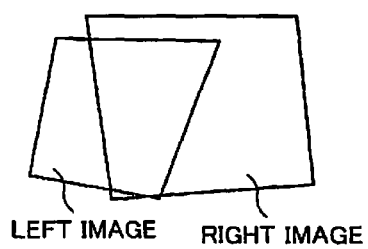
FIGS. 2A and 2B are explanatory diagrams for explaining stereo images.
Figure 2B:
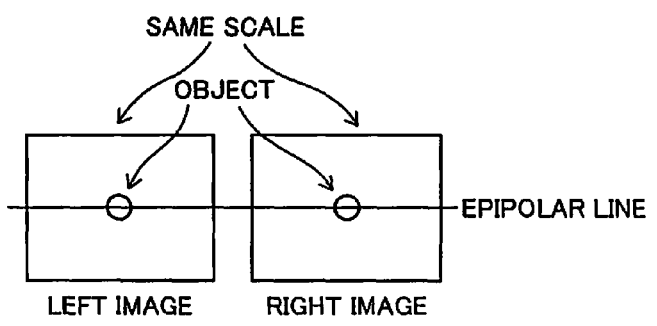

Next, the principle of creating stereo images is explained. The principle of creating stereo images is to correct images in order to be able to apply the stereo method. The stereo images are two images which are parallel to the photographed object, and in which a vertical parallax is removed. FIG. 2 is an explanatory diagram for explaining stereo-pair images. For example, although there is an area in which the right and left images shown in FIG. 2A have overlapped, three-dimensional measurement is impossible because of difference in scale, presence of rotation, and vertical parallax between these images. However, as shown in FIG. 2B, if the right and left images are controlled in scale, their rotations are corrected, and their vertical parallaxes are removed, the stereo method can be applied.

Figure 3:
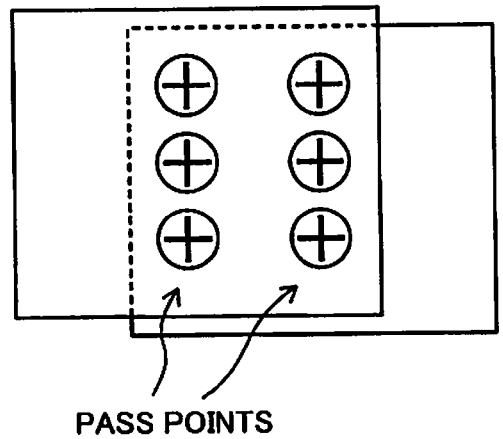
FIG. 3 is an explanatory diagram for explaining pass points.

The stereo images (stereo model) can be created by determining six or more same corresponding points on the right and left images. The same corresponding points on the right and left images are "pass points". FIG. 3 is an explanatory diagram for explaining pass points. As shown in FIG. 3, if coordinates of six corresponding points are on the right and left images, relative positions and tilts of the two cameras can be obtained, so stereo images (stereo model) can be created by correcting the scales, rotations, and vertical parallaxes of the right and left images.

3) Relative Orientation

Figure 4:
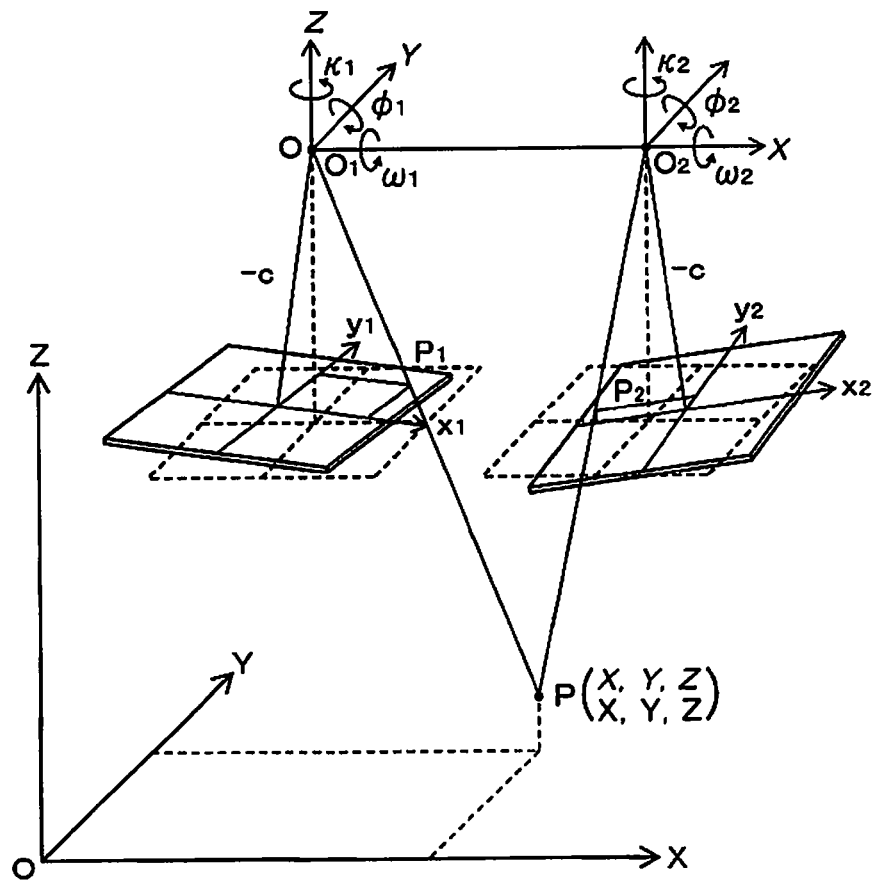
FIG. 4 is an explanatory diagram for explaining relative orientation.

The relative orientation is a principle for obtaining relative positions and tilts of cameras by using six or more points corresponding in the right and left images. FIG. 4 is an explanatory diagram for explaining the relative orientation. In the relative orientation, parameters are obtained from the coplanar conditional formulas (4) shown below.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad (4)$$

$X_{01}, Y_{01}, Z_{01}$:Coordinates of projected center of the left image $X_{02}, Y_{02}, Z_{02}$:Coordinates of projected center of the right image $X_1, Y_1, Z_1$:Left image coordinates $X_2, Y_2, Z_2$:Right image coordinates As shown in FIG. 4, an origin point of the model coordinate system is assumed to be a projection center $O_1$ on the left image, and the line connecting to the projection center $O_2$ on the right image is assumed to be the X-axis. In scale, the length of the baseline is assumed to be a unit length. In this case, five parameters are determined: the left camera's rotary angle κ1 about the Z-axis, rotary angle $\phi_1$ of the Y-axis, the right camera's rotary angle $\kappa_2$ about the Z-axis, rotary angle $\phi_2$ of the Y-axis, and the rotary angle $\omega_2$ of the X-axis. The left camera's rotary angle $\omega_1$ of the X-axis is zero, so it need not be taken into consideration. Under the above-mentioned conditions, the coplanar plane conditional formula (4) is converted into the formula (5), and respective parameters can be calculated by solving this formula (5).

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_2 = 0 \quad (5)$$

$\kappa_1$:Left camera's rotary angle about Z-axis $\phi_1$:Left camera's rotary angle about Y-axis $\kappa_2$:Right camera's rotary angle about Z-axis $\phi_2$:Right camera's rotary angle about Y-axis $\omega_2$:Right camera's rotary angle about X-axis Here, the following relationship formulas (6) and (7) for converting coordinates are formed between the model's XYZ coordinate system and the camera's xyz coordinate system:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} = 0 \quad (6)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix} \quad (7)$$

Unknown parameters are determined by using the above-mentioned formulas (6) and (7) according to the steps described below.

3-1. Assume an approximate initial value of zero as a rule.

3-2. Expand the coplanar conditional formula (5) using Taylor's formula about the approximate value, and make it linear. Determine the differential coefficients by using the formulas (6) and (7), and make observation formulas.

3-3. Determine the correction amount for the approximate value by the least square method.

3-4. Correct the approximate value.

3-5. Use the corrected approximate value, and repeat the steps 3-2 to 3-5 until the result converges.

By the above-mentioned steps, the relative three-dimensional positions and the tilts of three-axes of the cameras are determined, so stereo images (stereo models) can be created. The stereo images (stereo models), in real size, can be created by substituting the distance (length of baseline) between the cameras taking the stereo images. In addition, if coordinate values of 3 points in the XYZ-system can be given, the actual coordinate system can be converted, and three-dimensional measurement in the actual coordinate system is possible. Furthermore, if length of the baseline is assumed to be 1, three-dimensional coordinates in the model coordinate system can be calculated.

4) Connective Orientation

Figure 5A:
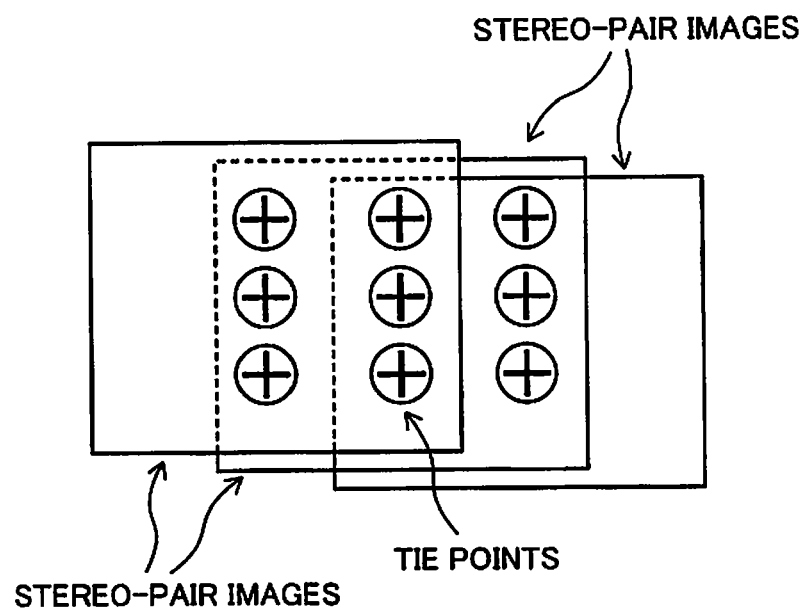
FIG. 5A is an explanatory diagram for explaining tie points.
Figure 5B:
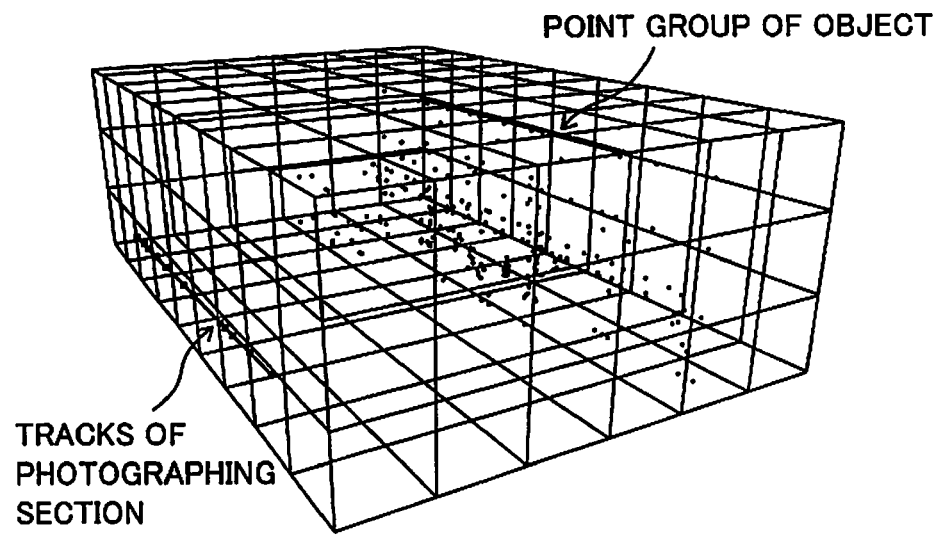
FIG. 5B is a diagram showing a result of three-dimensional measurement.

The above-mentioned stereo method is a method for determining three-dimensional coordinates by using two stereo images. In a case of a moving image, multiple pairs of stereo images exist. Therefore, to unify the tilt and the scale between multiple pairs of stereo images and to connect these images in the same coordinate system are required. This process is the connective orientation. This connective orientation requires three or more same points corresponding between stereo-pair images. The same points corresponding between stereo-pair images are tie points. FIG. 5A is an explanatory diagram for explaining tie points. When the number of common points between two pairs of stereo images is 3 points or more, one of the orientation elements is fixed, and the other orientation elements are manipulated, and connective processing is carried out. When this process was carried out, connective differences shown in following formula (8) were calculated. As a result, if the connective differences ΔZj and ΔDj are the predetermined values (for example, 0.0005 (1/2000)) or less, it is determined that the connective orientation was completed normally. When the connective orientation was completed normally, three-dimensional measurement based on a plurality of stereo images is possible. FIG. 5B is a diagram showing a result of three-dimensional measurement.

$DX_j = (X_{jr} - X_{jl})/(Z_0 - Z_{j1})$ $DY_j = (Y_{jr} - Y_{jl})/(Z_0 - Z_{j1})$ $DZ_j = (Z_{jr} - Z_{jl})/(Z_0 - Z_{j1})$ $DD_j = \sqrt{DX_j^2 + DY_j^2})) \quad (8)$ $(X_{j1}, Y_{j1}, Z_{j1})$: The j-th left model in the unified coordinate system $(X_{jr}, Y_{jr}, Z_{jr})$: The j-th right model in the unified coordinate system 5) Extracting Method for Extracting Characteristic Points For the above-mentioned relative orientation and connective orientation, the corresponding points had to be extracted from the right and left images. The corresponding points were extracted by extracting the characteristic points from one of the right or left image, and by tracking the points corresponding to the characteristic points from the other image. For example, a Moravec operator is used for extracting the characteristic points. As shown in Table 1, in the Moravec operator, the sum of squares about the difference value between the value of each pixel in four directions (the top and bottom, the right and left, and the two corners) and value of a center pixel is calculated, and minimum value of the four values is selected. This calculation formula is shown in formula (9). The characteristic points are extracted by comparing the minimum value with the threshold value of the Moravec operator as the initial setting value.

TABLE 1

| $I_{3,-2}$ | | $I_{1,-2}$ | | $I_{2,2}$ |
|---|---|---|---|---|
| | $I_{3,-1}$ | $I_{1,-1}$ | $I_{2,1}$ | |
| $I_{0,-2}$ | $I_{0,-1}$ | $I_{0,0}$ | $I_{0,1}$ | $I_{0,2}$ |
| | $I_{2,-1}$ | $I_{1,1}$ | $I_{3,1}$ | |
| $I_{2,-2}$ | | $I_{1,2}$ | | $I_{3,2}$ |

$$\min \sum_{j=-r}^{r} (I_{i,j} - I_{0,0})^2 (i = 0, \ldots, 3) \quad (9)$$

6) Tracking Method for Tracking Characteristic Points

Figure 6:
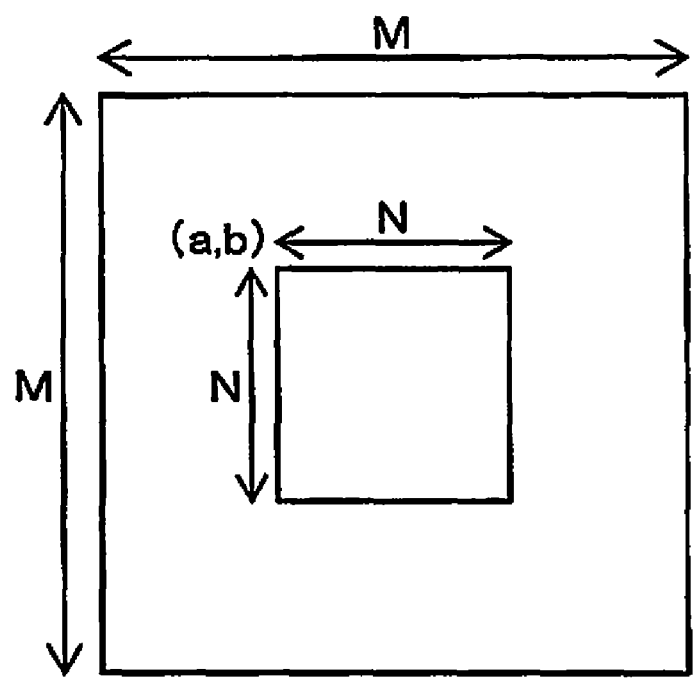
FIG. 6 is an explanatory diagram for explaining a sequential similarity detection algorithm (SSDA) method.

After the characteristic points were extracted from the left image, points corresponding to the characteristic points were tracked in the right image. For example, the Sequential Similarity Detection Algorithm (SSDA) method, which is a fast template matching, is used for tracking the characteristic points. FIG. 6 is an explanatory diagram for explaining the SSDA method. As shown in FIG. 6, moving a template image of N×N pixels over a search area $(M-N+1)^2$ in the tracking image of M×M pixels, and considering that the corresponding points were tracked at the position at which a difference R(a, b) of formula (10) was minimized. $(_{a, b})$ is the coordinates at the left top position of a template image in the tracking image, $I_{(a, b)}$ (m, n) is a partial image in the tracking image, T(m, n) is a template image, and R(a, b) is a difference between the partial image in the tracking image and the template image. In the image processing apparatus of the present invention, distance and direction of moving vector connecting a characteristic point extracted in the left image to a corresponding point tracked in the right image are compared with distance threshold and direction threshold of initial setting values, so erroneous corresponding points are removed.

$$R(a, b) = \sum_{m=0}^{N-1} \sum_{n=0}^{N-1} |I_{(a,b)}(m, n) - T(m, n)| \quad (10)$$

As mentioned above, when the number of corresponding points is 6 points or more, the relative orientation is possible. When the number of corresponding points is 3 points or more between stereo-pair images, the connective orientation is possible.

1. First Embodiment

Figure 7:
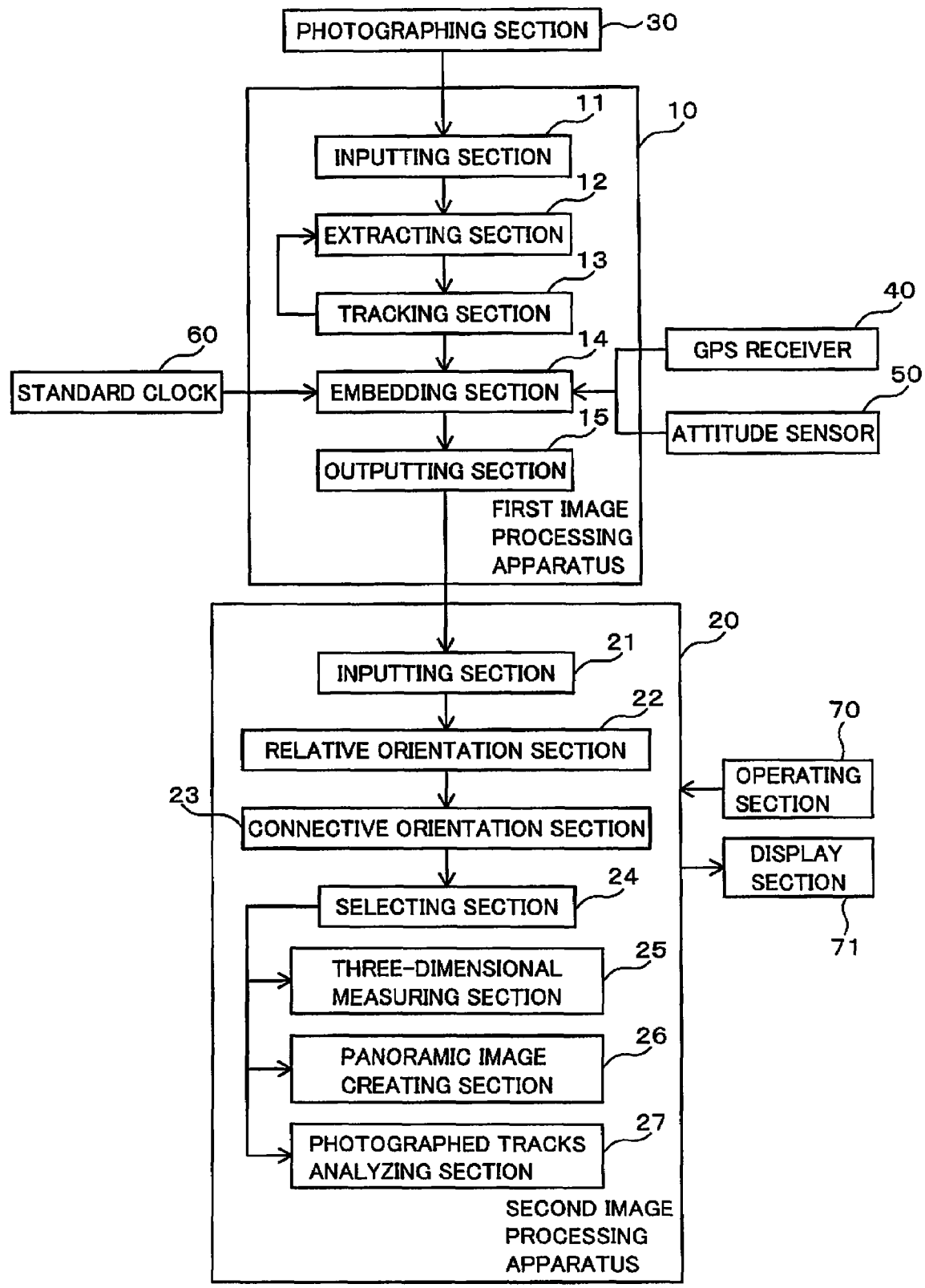
FIG. 7 is a block diagram showing an image processing apparatus and an image processing system.

An example of an image processing apparatus and an image processing system in the present invention using the above-mentioned stereo method will be described hereinafter. FIG. 7 is a block diagram showing an image processing apparatus and an image processing system. An image processing apparatus in the present invention comprises at least one of a first image processing apparatus 10 and a second image processing apparatus 20. The image processing apparatus 10 creates a tracking data required for orientation processing or three-dimensional measurement, and embeds the tracking data into each image, and outputs the embedded images. On the other hand, the image processing system in the present invention further comprises a photographing section 30, a GPS receiver 40, an attitude sensor 50, and a standard clock 60. Hereafter, a composition of each apparatus is explained in each item of the tracking data.

(Composition of the Image Processing System)

The photographing section 30, for example, is a CCD camera which can photograph a moving image, and converts photoelectric signals detected in a light detecting section into NTSC (National Television System Committee) signals, and outputs NTSC signals. The photographing section 30 photographs a moving image while moving progressively relative to a photographed object. The moving image obtained by the photographing section 30 is input into the first image processing apparatus 10.

1-1. GPS Information

The GPS receiver 40 receives electromagnetic waves from GPS satellites, and it calculates an absolute position of the photographing section 30. When the position information of the photographing section 30 is obtained, a relative coordinate system can be converted into an absolute coordinate system. The absolute position of the photographing section 30 calculated by the GPS receiver is input into the first image processing apparatus 10. This position information of the photographing section 30 is embedded into frame images photographed by the photograph section 30. In a composition not using the GPS receiver, the absolute coordinates of known control points can be input. The control points are set by using an operating section 70 on the screen in a display section 71, shown in FIG. 7, and the absolute coordinates of the control points are input into the input column displayed in the displaying section 71. In addition, when the absolute coordinates are unknown, the relative coordinate system can be converted into the real scale by inputting a known real distance between two points. The real distance between two points are set by using an operating section 70 on the screen in a displaying section 71, shown in FIG. 7, and is input into the input column displayed in the displaying section 71. In this case, GPS information is not embedded into frame images, and information in which GPS information does not exist is embedded.

1-2. Attitude Information

When an optical axis of the photographing section 30 is assumed to be the Z-axis, the attitude sensor 50 calculates rotary angles (or rotary angle speeds, or rotary accelerations) about three-axes which consist of the Z-axis, the X-axis which is perpendicular to the Z-axis, and the Y-axis which is perpendicular to these axes. For example, the attitude sensor 50 is a gyro measuring rotary angle speeds about three-axes. The attitude sensor 50 has an effect when the rotary angles about three-axes of the camera could not be calculated by relative orientation. In addition, when the photographing section 30 suddenly shakes while photographing, the shaking condition can be detected by the attitude information of the attitude sensor 50 embedded in images. Therefore, it is possible to determine that the shaking images are not to be used for measurement. The attitude information of the photographing section 30 measured by the attitude sensor 50 is input into the first image processing apparatus 10, and is embedded into frame images photographed by the photographing section 30.

1-3. Standard Time

For example, the standard clock 60 is a radio clock, and obtains a standard time. This standard time is used for synchronizing the photographing time of each frame image, calculating the time of the GPS receiver 40, and measuring the time of the attitude sensor 50. The standard time obtained by the standard clock 60 is input into the first image processing apparatus 10. This standard time is embedded into frame images photographed by the photographing section 30.

Composition of the Image Processing Apparatus

The first image processing apparatus 10 comprises an inputting section 11, an extracting section 12, a tracking section 13, an embedding section, and an outputting section 15.

1-4. Frame number, Interlace or Progressive

The inputting section 11 obtains frame images from the photographing section 30 by interlace or progressive sequentially. The frame images input from the inputting section 11 are allocated sequential frame numbers. The frame number and screen information of interlace or progressive are embedded into each frame image.

1-5. Threshold of Moravec Filter

The extracting section 12 extracts characteristic points from frame images input by the inputting section 11. The above-mentioned Moravec operator in Table 1 or formula (9) is used for extracting characteristic points. The value output by the Moravec operator is compared with threshold of the Moravec operator, and whether a point of the value should be extracted as a characteristic point is determined. This threshold of the Moravec operator is set as an initial value by using an operating section 70. The threshold of the Moravec operator is embedded into each frame image. As an extracting method for extracting characteristic points other than the Moravec filter, Harris filter and Susan filter, etc., can be used. In this case, their thresholds are embedded in frame images.

1-6. X and Y Coordinates of a Point, Point Number, Threshold of the Number of Characteristic Points in a Frame Image The points extracted by the extracting section 12 are allocated point numbers, the point numbers embedded with X and Y coordinates of the points into each frame image. The relative orientation is carried out by using this X and Y coordinates of the points. Furthermore, characteristic points extracted by the extracting section 12 are used as the pass points or tie points, so whether the number of characteristic points in a frame image is more than the threshold (for example, three points) of the number of characteristic points in a frame image is determined. This threshold of the number of characteristic points is also embedded into each frame image.

1-7. Template Color, Evaluation Value of a Template Matching, Threshold of the Evaluation Value, and Threshold of a Moving Distance The tracking section 13 tracks points corresponding to the characteristic points extracted by the extracting section 12 in a subsequent frame image or a prior frame image (neighboring frame images). In the tracking of characteristic points, the SSDA method of the above-mentioned template matching is used. The template image under tracking can be displayed in the displaying section 71, and a display color (template color) of the template image can be set by using the operating section 70. In addition, a difference (evaluation value) between a template image and a tracking image in the above-mentioned SSDA method is compared with the threshold of the evaluation value. When the evaluation value of the template matching is smaller than the threshold of the evaluation value, a tracking point is selected as a candidate point of a point corresponding to a characteristic point. Then, the tracking section 13 calculates a moving vector connecting the characteristic point to the candidate point. A distance of the moving vector is compared with a threshold of a moving distance. When the distance of the moving vector is smaller than the threshold of the moving distance, the candidate point is further selected as a candidate point. Furthermore, a direction of the moving vector is compared with a threshold of a moving direction. When the direction of the moving vector differs greatly from the threshold of the moving direction, the tracking point is excluded as a candidate point. Through such the steps, the point corresponding to the characteristic point is selected from among candidate points, and it is fixed. The above-mentioned template color, evaluation value of the template matching, threshold of evaluation value, threshold of the moving distance, and threshold of the moving direction are embedded into each frame image. The evaluation value about each point is used as a judgment material for judging whether the corresponding point is used as a control point. As template matching other than the SSDA method, a normalized cross-correlation method, a code matching method, etc., can be used.

1-8. Point status, Total Number of Points in a Frame Image, Number of Generations, and Threshold of the Number of Points Succeeded to the Next Generation When the tracking section 13 finishes tracking all points corresponding to characteristic points, dead or alive (point status) of characteristic points in a tracked frame image are fixed. In this way, the total number of points in a frame image is fixed. When the number of points tracked by the tracking section 13 is 6 points or less, the extracting section 12 extracts new characteristic points again. At this time, the number of extracting times is embedded as the number of generations into each frame image. Here, the generation, in other words, is a continuous image group of stereo-pair images. This number of generations is embedded into each image, so stereo-pair images used for the relative orientation can be easily selected by selecting two images in which the number of generations is equal. Furthermore, the number of points succeeded to the next generation is compared with threshold (for example, 6 points) of the number of points succeeded to the next generation. When the number of points succeeded to the next generation is 3 points or more, connective orientation between the generations is possible. The above-mentioned point status, total number of points in a frame image, number of generations, and threshold of the number of points succeeded to the next generation are embedded in a frame image. When the extracting section 12 extracts again, the sum of the number of points tracked by the tracking section 13 and the number of points extracted again by the extracting section 12 is the total number of points in a frame image. This total number of points in a frame image is used as a basis for determining whether points usable as control points are many or few. Images that are used for relative orientation can be selected according to the total number of points.

Figure 8:
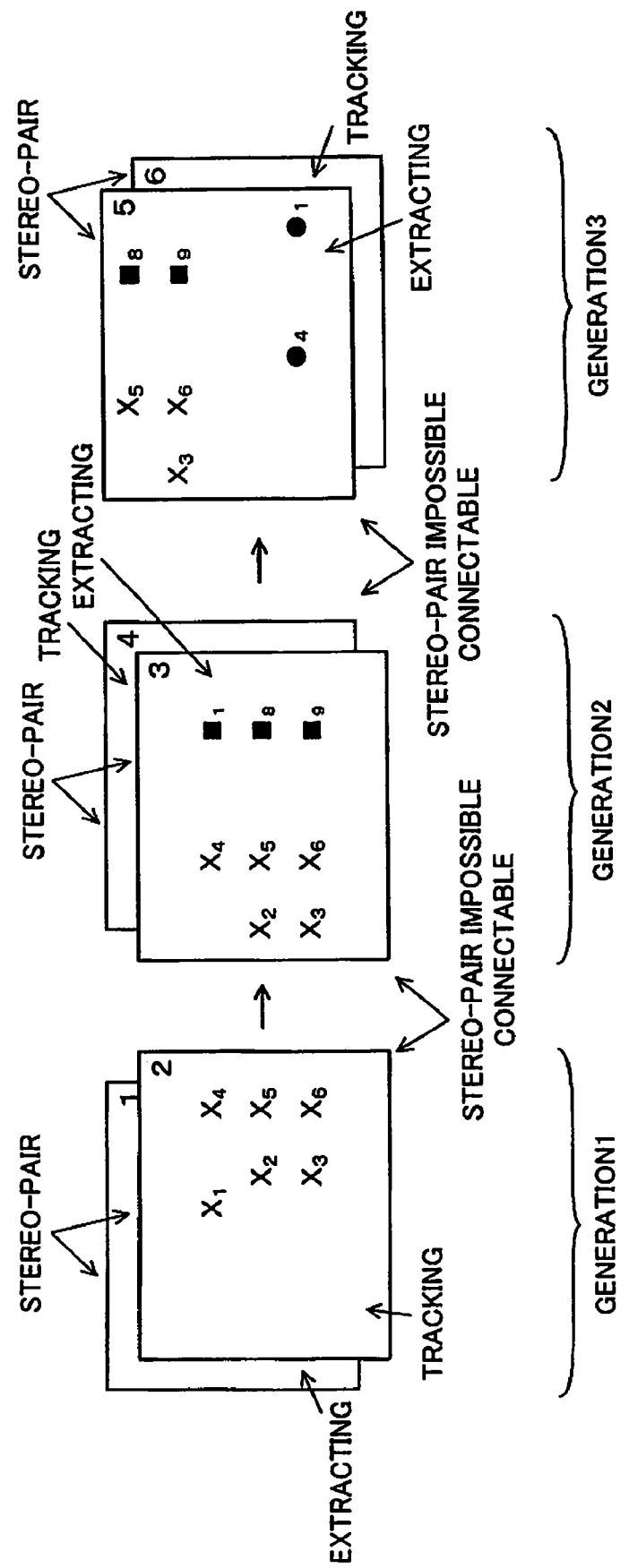
FIG. 8 is an explanatory diagram for explaining a generation.

The above-mentioned generation is explained hereinafter by way of specific example. FIG. 8 is an explanatory diagram for explaining a generation. In FIG. 8, continuous six frame images are shown. The frame numbers of frame images are shown at the top right side of a frame image shown in FIG. 8. The 6 points corresponding to the 6 characteristic points of $X_1$ to $X_6$ extracted in an image of frame number 1 have been tracked in an image of frame number 2. In the 6 points of $X_1$ to $X_6$ tracked in an image of frame number 2, only 5 points remained alive in an image of frame number 3. Therefore, the number of points in the image of frame number 3 is less than the threshold (6 points) of the number of points succeeded to the next generation, so the images of frames numbers 2 and 3 are unsuitable as stereo-pair images. Therefore, the number of generations is updated from generation 1 to generation 2. The points corresponding between the images of frames numbers 2 and 3 are 3 points or more, so connective orientation can be carried out.

1-9. Process Status, Generation Number, and Number of Succeeded Times

Figure 9:
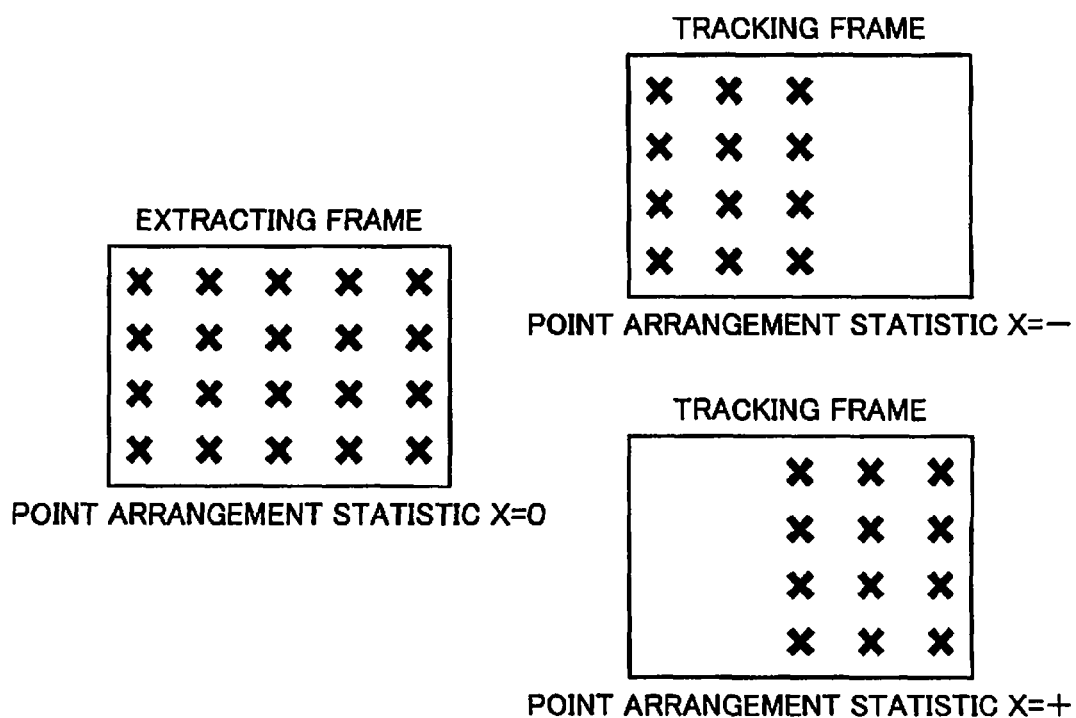
FIG. 9 is an explanatory diagram for explaining a method for calculating a point arrangement statistic.

When the number of generation is updated, characteristic points of black squares 1, 8, and 9 (■$_1$, ■$_8$, ■$_9$) are extracted again in a frame image 3. Thus, two kinds of process status (extracting and tracking) are repeated, for example, as extracting, tracking, generation updating, extracting, tracking, generation updating, extracting, Then, X shapes 3, 5, and 6 ($X_3$, $X_5$, $X_6$) extracted in the generation 1 and black squares 8 and 9 (■$_8$, ■$_9$) extracted in the generation 2 remain alive together in the frame image 5. Therefore, for identifying these points, each point is given the generation number showing the generation in which each point is extracted. Specifically, the generation number of X shapes 3, 5, and 6 ($X_3$, $X_5$, $X_6$) in the frame image 5 is 1, the generation number of black squares 8 and 9 (■$_8$, ■$_9$) is 2, and the generation number of black circles 1 and 4 (●$_1$, ●$_4$) is 3. In addition, each point is also given the number of generations (number of succeeded times) succeeded from the extracted generation. Specifically, X shapes 3, 5, and 6 ($X_3$, $X_5$, $X_6$) in the frame image 5 are succeeded from generation 1 to generation 3, so the number of succeeded times of X shapes 3, 5, and 6 ($X_3$, $X_5$, $X_6$) in the frame image 5 is 2. Similarly, the number of succeeded times of black squares 8 and 9 (■$_8$, ■$_9$) is 1, and the number of succeeded times of black circles 1 and 4 (●$_1$, ●$_4$) is 0. The above-mentioned process status, generation number, and number of succeeded times are embedded into each frame image. A point in which the number of succeeded times is 1 or more can be used as a tie point. When the number of the tie points is 3 points or more in a frame image, it is possible to determine that the frame image is an image that is usable for connective orientation. 1-10. Point arrangement statistic Furthermore, the point arrangement statistic, which taken as a statistic of arrangements of points extracted or tracked, is calculated. FIG. 9 is an explanatory diagram for explaining a method for calculating a point arrangement statistic. The point arrangement statistic shows how the points are arranged in the frame image. When the center coordinates in an image is assumed to be (0,0), the point arrangement statistic is calculated as sum values of X and Y coordinates in each point. For example, when 5 points having coordinate values of (−150, 20), (50, −80), (250, 40), (35, −180), and (−300, 200) exists in a frame image of 640×480 pixels, the point arrangement statistic in the X direction is −150+50+250+35−300=−115, and the point arrangement statistic in the Y direction is 20−80+40−180+20=0. That is, the point arrangement statistic is (−115, 0), and 5 points are arranged in the right side of a frame image. Biased condition of points in each frame image has an influence on whether calculation of the relative orientation converges, so the biased condition of points can be determined by the point arrangement statistic, and whether the frame image can be used for the relative orientation can be determined. This point arrangement statistic is embedded into a frame image.

Figure 10A:
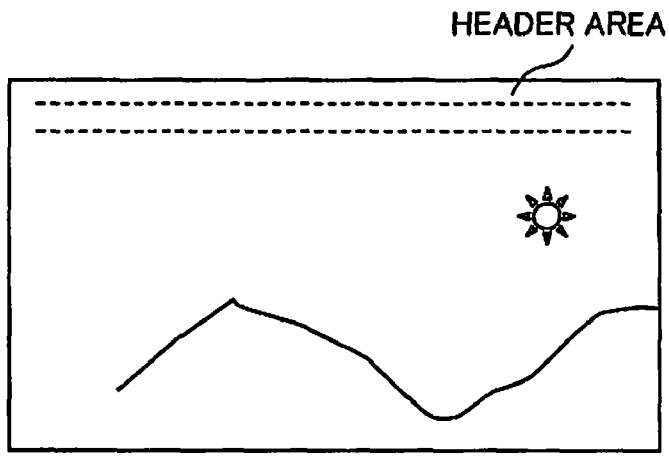
FIGS. 10A, 10B, and 10C are explanatory diagrams for explaining a method for embedding a tracking data.
Figure 10B:
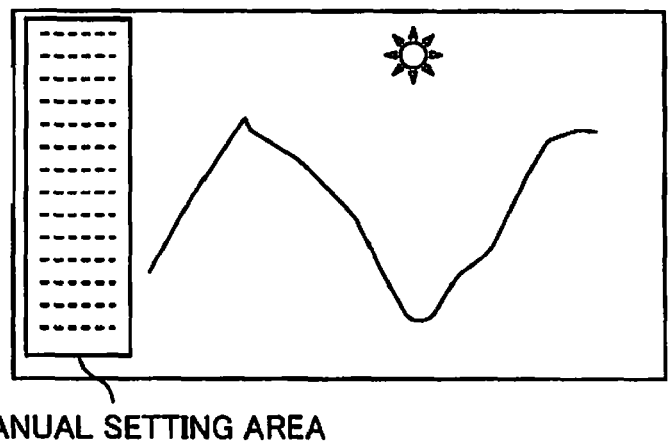
Figure 10C:
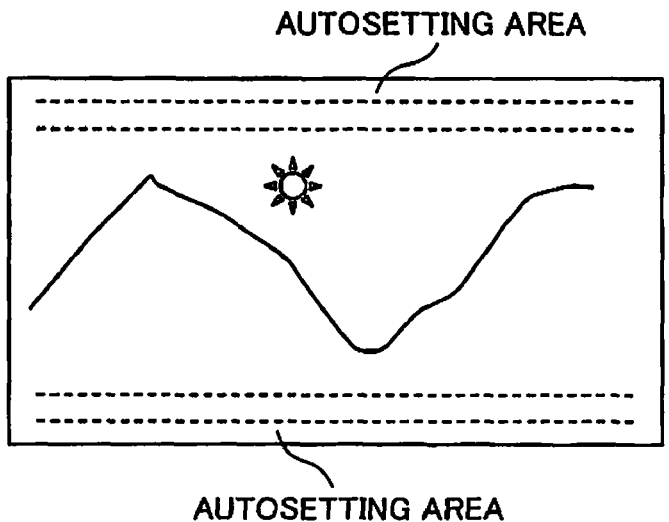

The embedding section 14 in FIG. 7 embeds the above-mentioned tracking data into a frame image. FIG. 10 is an explanatory diagram for explaining a method for embedding the tracking data. The embedding section 14 comprises three kinds of embedding modes shown in FIGS. 10A, 10B, and 10C. The three kinds of embedding modes are selected by using the operating section 70. In each embedding mode, the tracking data is embedded in a non-used area of a frame image. As a result, the moving image in which is embedded the tracking data can be used as reusable data. Three kinds of embedding modes are explained hereinafter.

1-A. Embedding in a Header Area

As shown in FIG. 10A, the embedding section 14 embeds the tracking data sequentially from the first pixel in each frame image. The header area in a frame image is not often used, so the header area is suitable for a storage area of the tracking data. In addition, the second image processing apparatus 20 reads out the tracking data easily, and a readout time is short.

1-B. Embedding into a Manual Setting Area

As shown in FIG. 10B, the embedding section 14 embeds the tracking data into a manual setting area in a frame image. The manual setting area is set as a rectangular area by using the operating section 70 on an image displayed at the displaying section 71. At this time, X and Y coordinates of the top left pixel and the bottom right pixel in the manual setting area are embedded into a header area of a frame image. In this way, the second image processing apparatus 20 can recognize the manual setting area in which is embedded the tracking data. This mode is effective when a non-used area in a frame image can be identified. According to this mode, the moving image in which is embedded the tracking data can be used as reusable data.

1-C. Embedding into an Autosetting Area

In addition, as shown in FIG. 10C, the embedding section 14 decides automatically the position of a photographed object in a frame image by the above-mentioned point arrangement statistic, and embeds the tracking data into an autosetting area (area in which the photographed object does not exist). At this time, X and Y coordinates of the top left pixel and the bottom right pixel in the autosetting area are embedded into a header area of a frame image. As a result, the second image processing apparatus 20 can recognize the autosetting area in which is embedded the tracking data. According to this mode, the moving image in which is embedded the tracking data can be used as reusable data.

A data structure of the tracking data embedded by the embedding section 14 is explained hereinafter. FIGS. 11A and 11B is a diagram showing a data structure of the tracking data. FIG. 11A is a diagram showing a data format of the tracking data, and FIG. 11B is a diagram showing a specific example of the tracking data. The tracking data is composed of data per a frame image shown in an upper row of FIG. 11A and data per a point shown in a lower row of FIG. 11A. The tracking data is embedded in order of data per a frame image, and data per a point. The upper bound for the number of points in a frame image is set, so a storage area for a predetermined number of points is prepared for data per a point.

A specific example of the tracking data shown in FIG. 11B is explained hereinafter. The frame number of a frame image is 5, and the frame image is an interlaced image. A template color for displaying a template image is set in red. This frame image is a frame from which is extracted characteristic points, and the number of generations is 3. In this frame image, there are 7 points, and the point arrangement statistics of 7 points is (−30, −120). In addition, the threshold of an evaluation value is 10, the threshold of a moving distance is 10 pixels, the threshold of the number of characteristic points in a frame image is 6 points, and the threshold of the number of points succeeded to the next generation is 6 points. Absolute coordinates of the photographing section 30 is N40°5, E135°3, standard time is 13:25:08, attitude information of the photographing section 30 is X20°, Y0°, Z45°. X and Y coordinates of point number 1 is (450, 630), generation (generation number) extracted at this point is 3, number of succeeded times is 0. The point of point number 1 is a point extracted at the first time in this frame image, evaluation value of the template matching is 0, and point status is "alive". On the other hand, X and Y coordinates of point number 3 are (10, 180), generation (generation number) in which the point was extracted is 1, number of succeeded times is 2, evaluation value of the template matching is 10, and point status is "alive".

The frame image in which is embedded the tracking data of the above-mentioned data structure is output to the second image processing apparatus 20 sequentially by the outputting section 15 shown in FIG. 7. As the outputting section 15, the interface such as USB (Universal Serial Bus) 2.0 or Ethernet (registered trademark) is used. The output frame images are input into the second image processing apparatus 20.

Composition of Second Image Processing Apparatus

The second image processing apparatus 20 comprises a inputting section 21, a relative orientation section 22, a connective orientation section 23, a selecting section 24, a three-dimensional measuring section 25, a panoramic image creating section 26, and a photographed tracks analyzing section 27.

The inputting section 21 inputs frame images in which are embedded the tracking data from the first image processing apparatus 10. First, the second image processing apparatus 20 carries out the above-mentioned relative orientation and the connective orientation. The relative orientation section 22 reads out the embedded tracking data, and it selects stereo-pair images by number of generations, total number of points in a frame image, and point arrangement statistics in a frame image. First, as the stereo-pair images, the relative orientation section 22 selects two images in which the number of generations is equal. At this time, the relative orientation section 22 gives priority to frame images in which the total number of points in a frame image is high and in which arrangement bias of points is small (point arrangement statistics is close to (0, 0)). For example, in the case of FIG. 8, in frames numbers 3 and 4, the number of generations of 3 is the same, and the total number of points in a frame image of 8 is high, and bias of point arrangement is small, so the frames numbers 3 and 4 are selected as stereo-pair images.

Next, the relative orientation section 22 decides 6 control points (pass points) from the selected stereo-pair images. At this time, the relative orientation section 22 searches for points in which point status is "alive", and in which the evaluation value of the template matching is good (in which a difference between the evaluation value of the template matching and the threshold of evaluation value is big), from the one image. Then, the relative orientation section 22 obtains 6 points having the same generation number as pass points from the other image. For example, when a point X4 in which point status is "alive", and in which the evaluation value of the template matching is good, was found from the tracking data of frame number 3, the relative orientation section 22 searches a point $X_4$ from the frame number 4, in which the generation number is the same as the point $X_4$ in the frame number 3, and sets the point $X_4$ as the pass point. The remaining five points are decided by the same steps. After that, the relative orientation 22 substitutes X and Y coordinates of the decided 6 pass points for the formulas (5) to (7), and calculates the relative three-dimensional positions and the angles of rotation about each of the axes.

When calculation of unknown parameters converged by the relative orientation section 22, the connective orientation section 23 carries out the connective orientation. First, the connective orientation section 23 selects a connectable image to the stereo-pair images used by the relative orientation section 22. The connectable image is selected by whether common points (tie points) between the stereo-pair images are 3 points or more. In particular, when the connectable image is not in the same generation as stereo-pair images, points in which the number of succeeded times is large are searched from the connectable image, and the points are decided as tie points. Furthermore, the connective orientation section 23 fixes parameters calculated in the relative orientation, and calculates unknown parameters of the connectable image by using the formulas (5) to (7). Then, the connective orientation section 23 calculates the connective differences in the formula (8) in order to confirm whether the calculated results are normal. When the connective differences $\Delta Zj$ and $\Delta Dj$ are more than the predetermined values (for example, 0.0005 (1/2000)), the connective orientation section 23 displays an unconnected frame number on the displaying section 71.

After the connective orientation section 23 carried out a connection of the stereo model, the selecting section 24 in FIG. 7 selects frame images in which are embedded the tracking data, which are required for each application such as the three-dimensional measuring section 25, the panoramic image creating section 26, and the photographed tracks analyzing section 27. In addition, the selecting section 24 makes files or databases including the selected frame images and the parameters calculated by the orientation processing. In the case of making files, the selecting section 24 saves the frame images in which are embedded the tracking data that were still image files or moving image files. On the other hand, in the case of making databases, the selecting section 24 stores the tracking data in the tracking data table which was designed in the relational database management system (RDBMS), and stores the frame images in the frame image table, and stores the orientation parameters in the orientation parameter table. As a result, the tracking data is related to the frame images. According to this mode, all application software can search, insert, update, and delete data by a common structured query language (SQL).

The three-dimensional measuring section 25, the panoramic image creating section 26, and the photographed tracks analyzing section 27 read out the tracking data, the frame images, and the orientation parameters, which are selected by the selecting section 24, from the files or the database. Then, the three-dimensional measuring section 25 measures three-dimensional coordinates in each point by using the orientation parameters and the formula (1) to (3). In addition, the three-dimensional measuring section 25 creates three-dimensional point group data and surface models, and measures cross section, volume, etc. The panoramic image creating section 26 transforms the frame images into stereo images projectively by using the orientation parameters. The panoramic image creating section 26 connects the stereo images by using the coordinates of points transformed projectively, and a panoramic image is created. The photographed tracks analyzing section 27 transforms the relative coordinates which were unified by a connective orientation section 23 to the absolute coordinates of the photographing section 30 by using absolute coordinates of the photographing section 30 obtained from the GPS receiver 40 and the standard time, and plots the absolute coordinates in the three-dimensional space. In addition, the photographed tracks analyzing section 27 displays the attitude vectors of the photographing section 30 on the plotted absolute coordinates, by using an attitude information calculated by the relative orientation section 22 or measured by the attitude sensor 50.

Priority of the First Embodiment

The tracking data required for carrying out orientation processing is composed of many kinds of data, and relates to each image closely. This tracking data is embedded into each image, so the management of the tracking data is easy in carrying out orientation processing. In addition, images embedded the tracking data are output from the first image processing apparatus 10 sequentially, so the second image processing apparatus 20 can carry out orientation processing based on this image one by one. That is, the second image processing apparatus 20 can start the orientation processing without waiting for the finish of the inputting of the moving image. Therefore, the second image processing apparatus 20 can quickly determine whether the image is suitable for the orientation processing. Furthermore, the first image processing apparatus 10 outputs the images in which are embedded the tracking data, so the first image processing apparatus 10 only has to have an interface outputting the images, and an interface outputting the tracking data is not required. Therefore, in the first image processing apparatus 10, the number of parts is few, and the transmission speed of data required for orientation processing is high. Moreover, the embedding section 14 embeds the following tracking data, so an effect as shown in Table 2 is obtained.

used as reusable data by setting the non-used area as a manual setting area. In addition, the embedding section 14 embeds the tracking data by judging a non-used area of an image automatically according to the point arrangement statistic, so the moving image in which is embedded the tracking data can be used as reusable data.

2. Second Embodiment

Figure 12:
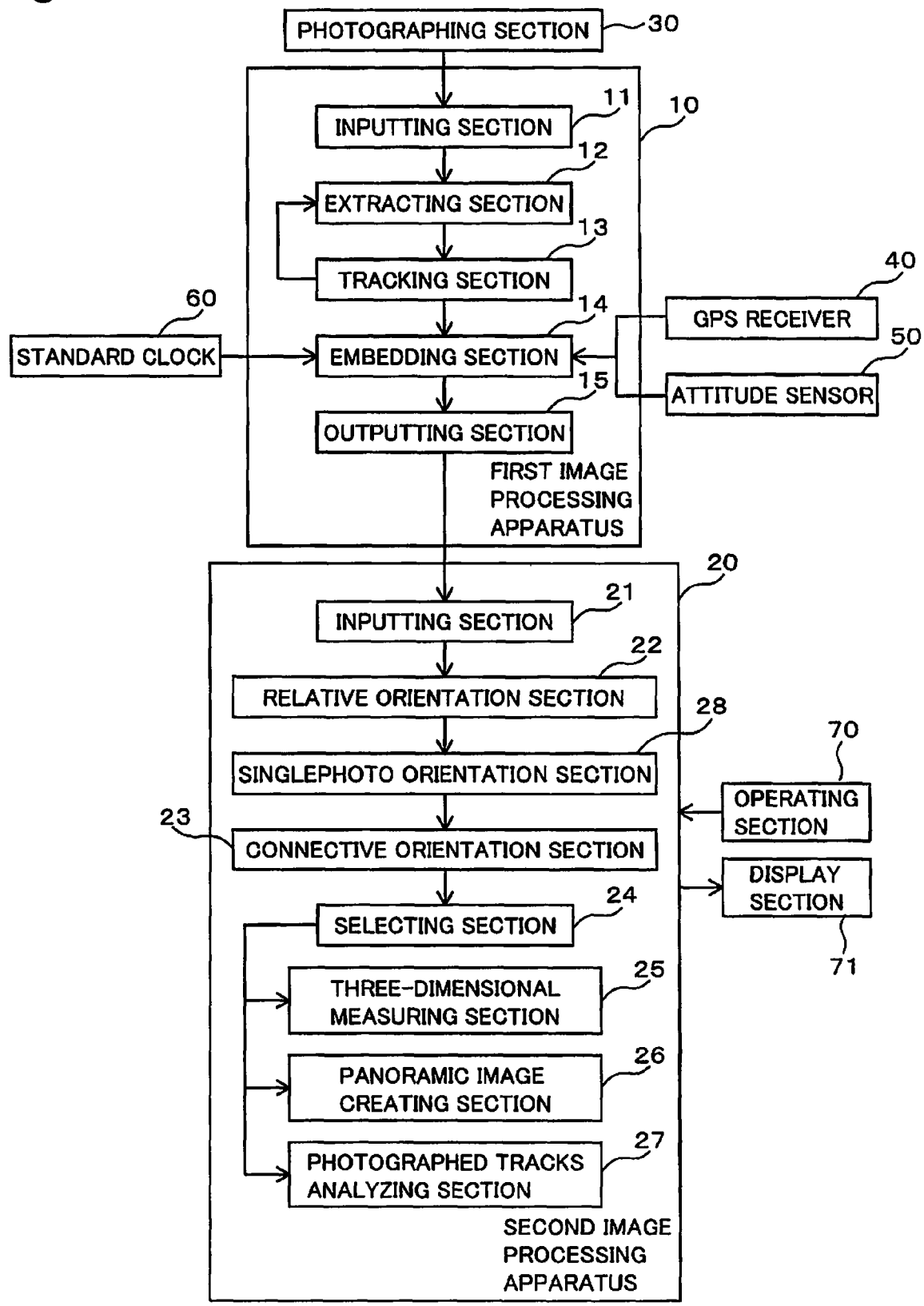
FIG. 12 is a block diagram showing an image processing apparatus and an image processing system comprising a single photo orientation section.

An example of an image processing apparatus and an image processing system further comprising a single photo orientation section will be described hereinafter. FIG. 12 is a block diagram showing an image processing apparatus and an image processing system comprising a single photo orientation section. The second image processing apparatus comprises a single photo orientation section 28 between the relative orientation 22 and the connective orientation 23. The single photo orientation section 28 determines a relationship between image coordinates and three-dimensional coordinates of points included in the tracking data embedded into single image by using a collinear conditional formula or the Direct Linear Transformation (DLT) method described below.

2-1. Single Photo Orientation

The single photo orientation calculates a position (X0, Y0, Z0) and a tilt (ω, φ, κ) of a camera by using a collinear

TABLE 2

| Tracking data | Effect |
|---|---|
| Evaluation value of the template matching | The relative orientation section 22 and the connective orientation section 23 can select usable control points (pass points, tie points) by superior or inferior of the evaluation value of the template matching. |
| Number of generations | The relative orientation section 22 can obtain stereo-pair images by only selecting two images in which the number of the generations is equal. |
| Number of succeeded times | The connective orientation section 23 can obtain the tie points, in which the number of succeeded times is one or more. |
| Total number of points in a frame image | The total number of points in a frame image is used as a judgment material for judging whether points usable as control points are many or few, so the relative orientation section 22 can select an image used for the relative orientation by the total number of points in a frame image. |
| Point arrangement statistics | Biased condition of point arrangement in each image has an influence on whether calculation of the relative orientation converges. In the relative orientation section 22, images in which the bias of point arrangement is small can be selected by the point arrangement statistic. |
| GPS information | The relative orientation section 22 and the connective orientation section 23 can convert the relative coordinate system into the absolute coordinate system by the absolute coordinates of the photographing section 30. In a composition not using the GPS receiver, the absolute coordinates of known control points can be input. In addition, when the absolute coordinates are unknown, the relative coordinate system can be converted into the real scale by inputting known real distance between two points. In this case, GPS information is not embedded into a frame image, and information in which GPS information does not exist is embedded. |
| Attitude information | When calculation of the relative orientation section 22 does not converge, three-dimensional coordinates measurement of points extracted by the extracting section 12 and points tracked by the tracking section 13 can be measured by this attitude information of the photographing section 30. In addition, when the photographing section 30 suddenly shakes during photographing, the shaking state can be detected by the attitude information embedded in an image. Therefore, it is possible to decide not to use shaking images for the measurement. |

On the other hand, when the embedding section 14 embedded the tracking data into a header area of an image, the reading time of the tracking data is shortened. In addition, when a non-used area of an image is known beforehand, the moving image in which is embedded the tracking data can be condition formed on the control points photographed in a single photo, and determines a relationship between image coordinates (x, y) and ground coordinates (X, Y, Z). The collinear condition is a condition in which a projection center, a photo image, and a photographed object on the ground are on one straight line. The position (X0, Y0, Z0) and the tilt ($\omega$, $\phi$, $\kappa$) of the camera are called outer orientation elements.

First, the camera coordinate system is assumed to be (x, y, z), the image coordinate system is assumed to be (x, y), and the ground coordinate system is assumed to be (X, Y, Z), and a camera is assumed to photograph in the direction in which an optical axis of the camera is rotated only $\kappa$, $\phi$, and $\omega$ to counterclockwise in a positive direction of each coordinate axis. Then, image coordinates of 4 control points and three-dimensional coordinates of these are substituted for the second-order projective transformation formula shown in the formula (11). Then, parameters of b1 to b8 are calculated based on observation formulas.

$$X = \frac{b1 \cdot x + b2 \cdot y + b3}{b7 \cdot x + b8 \cdot y + 1} \quad (11)$$

$$Y = \frac{b4 \cdot x + b5 \cdot y + b6}{b7 \cdot x + b8 \cdot y + 1}$$

X, Y: Ground coordinates of the reference points x, y: Image coordinates of the reference points The outer orientation elements are calculated from the following formula (12) by using parameters from b1 to b8 in the formula (11).

$\omega = \tan^{-1}(C \cdot b8)$ $\phi = \tan^{-1}(-C \cdot b7 \cdot \cos \omega)$ $\kappa = \tan^{-1}(-b4/b1)(\phi=0)$ $\kappa = \tan^{-1}(-b2/b5)(\phi \neq 0, \omega=0)$ $\kappa = \tan^{-1}\{-(A1 \cdot A3 - A2 \cdot A4)/(A1 \cdot A2 - A3 \cdot A4)/(A1 \cdot A2 - A3 \cdot A4)\}(\phi \neq 0, \omega \neq 0)$ $Z0 = C \cdot \cos \omega \{(A2^2 + A3^2)/(A1^2 + A4^2)\}^{1/2} + Zm$ $X0 = b3 - (\tan \omega \cdot \sin \kappa / \cos \phi - \tan \phi \cdot \cos \kappa) \times (Zm - Z0)$ $Y0 = b6 - (\tan \omega \cdot \cos \kappa / \cos \theta - \tan \phi \cdot \sin \kappa) \times (Zm - Z0)$ (b 12)

Here, $A1 = 1 + \tan^2 \phi$, $A2 = B1 + B2 \cdot \tan \phi / \sin \omega$ $A3 = B4 + B5 \cdot \tan \phi / \sin \omega$ $A4 = \tan \phi / (\cos \phi \cdot \tan \omega)$ Zm: Average elevation of 4 reference points (here, 4 reference points are coordinates on the same plain, so the elevation is assumed to be fixed.)

C: Focal length

Next, according to a principle of single photo orientation, camera coordinates (xp, yp, zp) corresponding to the photographed object on the ground in the inclined camera coordinate system are calculated by the following formula (13). The camera tilt ($\omega$, $\phi$, $\kappa$) calculated in the formula (12) is substituted for the formula (13), and parameters from a11 to a33 are decided by calculating a rotation matrix.

$$\begin{pmatrix} xp \\ yp \\ zp \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \quad (13)$$

$$\begin{pmatrix} \cos\kappa & -\sin\kappa & 0 \\ \sin\kappa & \cos\kappa & 0 \\ 0 & 0 & 1 \end{pmatrix} \begin{pmatrix} X - X0 \\ Y - Y0 \\ Z - Z0 \end{pmatrix}$$

$$= \begin{pmatrix} a11 & a12 & a13 \\ a21 & a22 & a23 \\ a31 & a32 & a33 \end{pmatrix} \begin{pmatrix} X - X0 \\ Y - Y0 \\ Z - Z0 \end{pmatrix}$$

X0, Y0, Z0: Ground coordinates of the projection center

The decided parameters from a11 to a33, the camera position (X0, Y0, Z0) decided by the formula (12), and coordinates (X, Y, Z) of the control points are substituted for the following collinear conditional formula (14) in which a projection center, a photo image, and a photographed object on the ground are on one straight line. Then, image coordinates (x, y) are determined.

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (14)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y$$

c: Screen distance (Focal length), x, y: Image coordinates of the reference points or unknown points X, Y, Z: Ground coordinates of the reference points or unknown points $X_0$, $Y_0$, $Z_0$: Position of the camera a11 to a33: Tilt of the camera (elements of 3 by 3 rotation matrix)

$\Delta x$, $\Delta y$: Correction value of the inner orientation of the camera

2-2. DLT Method

The DLT method approximates a relationship between image coordinates and ground coordinates (three-dimensional coordinates) of the photographed object by using a third-order projective transformation formula. The basic formula of the DLT method is the following formula (15).

$$x = \frac{L_1 X + L_2 X + L_3 Z + L_4}{L_9 X + L_{10} X + L_{11} Z + 1} \quad (15)$$

$$y = \frac{L_5 X + L_6 X + L_7 Z + L_8}{L_9 X + L_{10} X + L_{11} Z + 1}$$

x, y: Image coordinates of the reference points or unknown points

X, Y, Z: Ground coordinates of the reference points or unknown points $L_1$ to $L_{11}$: Unknown parameters in the DLT method A linear formula of the formula (16) can be derived by deleting the denominator of the formula (15).

$$XL_1+YL_2+ZL_3+L_4-xXL_9-xYL_{10}-xZL_{11}=x$$

$$XL_5+YL_6+ZL_7+L_8-yXL_9-yYL_{10}-yZL_{11}=y \quad (16)$$

In addition, the formula (16) was converted into the following formula (17).

$$\begin{vmatrix} X & Y & Z & 1 & 0 & 0 & 0 & 0 & -xX & -xY & -xZ \\ 0 & 0 & 0 & 0 & X & Y & Z & 1 & -yX & -yY & -yZ \end{vmatrix} \begin{vmatrix} L_1 \\ L_2 \\ L_3 \\ L_4 \\ L_5 \\ L_6 \\ L_7 \\ L_8 \\ L_9 \\ L_{10} \\ L_{11} \end{vmatrix} = \begin{vmatrix} x \\ y \end{vmatrix} \quad (17)$$

When the formula (17) is directly solved by using the least squares method, eleven unknown parameters from $L_1$ to $L_{11}$ that determine relationships between image coordinates and ground coordinates can be obtained. Three-dimensional coordinates of the photographed object can be decided by these unknown parameters.

Composition and Priority of the Second Embodiment

The single photo orientation section 28 carries out the above-mentioned single photo orientation or the DLT method for the single image input by the inputting section 21. At this time, the single photo orientation section 28 substitutes three-dimensional coordinates of 4 points, in which the relative orientation section 22 decided in the model coordinate system, for the formulas (11) and (12). Then, the single photo orientation section 28 calculates the position and the tilt of the photographing section 30, and determines the formula (13) showing a relationship between image coordinates and ground coordinates. When real coordinates input by the operating section 70 are 4 control points or more, the single photo orientation section 28 can convert the model coordinate system into the real coordinate system by using these coordinates. By providing this single photo orientation section 28, it is possible to obtain three-dimensional coordinates of points in the tracking data embedded in a single image in which the relative orientation section 22 did not use as stereo-pair images. In addition, it is possible to obtain the position information and the attitude information of the photographing section 30 that photographed the single image.

Furthermore, the single photo orientation section 28 substitutes the outer orientation elements, which calculated by the relative orientation section 22, for the collinear conditional formula shown in the formula (13), so the single photo orientation section 28 can decide three-dimensional coordinates of points in the tracking data embedded in the single image. On the other hand, when three-dimensional coordinates that the relative orientation section 22 calculated in the model coordinate system, or real coordinates input by the operating section 70, are 6 points or more, the single photo orientation section 28 can obtain the unknown parameters by the projective transformation formula of the DLT method shown in the formula (17), and can decide the relationship between image coordinates and ground coordinates.

The present invention can be used for an image processing apparatus carrying out a topographic survey, searches of disaster areas and falling rocks, measurements of earth and sand volume, and measurements of tunnels.

What is claimed is:

1. An image processing apparatus comprising:
   an inputting section for inputting a plurality of continuous images which were photographed by a photographing section progressively moving relative to a photographed object;
   an extracting section for extracting characteristic points from images input by the inputting section;
   a tracking section for tracking the points corresponding to the characteristic points in the plurality of continuous images;
   an embedding section for embedding tracking data, which includes data of extracted and tracked points by the extracting section and the tracking section, into each image; and
   an outputting section for outputting the plurality of continuous images sequentially in which the tracking data was embedded by the embedding section,
   wherein the tracking section tracks the points corresponding to the characteristic points by using a template matching, and the embedding section embeds an evaluation value of the template matching into each image.

2. The image processing apparatus according to claim 1, wherein when the number of points tracked by the tracking section is less than a predetermined number, the extracting section extracts characteristic points again, and the embedding section embeds the number of extracting times as the number of generations into each image.

3. The image processing apparatus according to claim 2, wherein the characteristic points extracted by the extracting section are tracked in the plurality of continuous images, so the characteristic points are succeeded to a next generation, and the embedding section embeds the number of succeeded times into each image.

4. The image processing apparatus according to claim 2, wherein the embedding section embeds the total number of points extracted and tracked by the extracting section and the tracking section in each image.

5. The image processing apparatus according to claim 1, further comprising:
   a GPS receiver for obtaining position information of the photographing section;
   wherein the embedding section embeds the position information from the GPS receiver into an image.

6. The image processing apparatus according to claim 1, further comprising:
   an attitude sensor for detecting an attitude information of the photographing section;
   wherein the embedding section embeds the attitude information from the attitude sensor into an image.

7. The image processing apparatus according to claim 1, wherein the embedding section embeds the tracking data into a header area of each image.

8. The image processing apparatus according to claim 1, further comprising:
   an inputting section for inputting the plurality of continuous images sequentially in which the tracking data was embedded;
   a relative orientation section for performing a relative orientation to stereo-pair images selected by the tracking data in the images from the inputting section;

a connective orientation section for connecting a coordinate system between stereo-pair images and other stereo-pair images; and a three-dimensional measuring section for measuring three-dimensional coordinates of points included in the tracking data in the coordinate system connected by the connective orientation section.

9. The image processing apparatus according to claim 8, further comprising:

a single photo orientation section for orientating a relationship between image coordinates of points included in the tracking data and three-dimensional coordinates of the points by using a collinear conditional formula or the Direct Linear Transformation (DLT) method to a single image input by the inputting section.

10. An image processing apparatus comprising:

an inputting section for inputting a plurality of continuous images which were photographed by a photographing section progressively moving relative to a photographed object;

an extracting section for extracting characteristic points from images input by the inputting section;

a tracking section for tracking the points corresponding to the characteristic points in the plurality of continuous images;

an embedding section for embedding tracking data, which includes data of extracted and tracked points by the extracting section and the tracking section, into each image; and an outputting section for outputting the plurality of continuous images sequentially in which the tracking data was embedded by the embedding section, wherein the embedding section embeds a point arrangement statistic of extracted and tracked points by the extracting section and the tracking section in each image.

11. The image processing apparatus according to claim 10, wherein when the number of points tracked by the tracking section is less than a predetermined number, the extracting section extracts characteristic points again, and the embedding section embeds the number of extracting times as the number of generations into each image.

12. The image processing apparatus according to claim 11, wherein the characteristic points extracted by the extracting section are tracked in the plurality of continuous images, so the characteristic points are succeeded to a next generation, and the embedding section embeds the number of succeeded times into each image.

13. The image processing apparatus according to claim 11, wherein the embedding section embeds the total number of points extracted and tracked by the extracting section and the tracking section in each image.

14. The image processing apparatus according to claim 10, further comprising:

a GPS receiver for obtaining position information of the photographing section;

wherein the embedding section embeds the position information from the GPS receiver into an image.

15. The image processing apparatus according to claim 10, further comprising:

an attitude sensor for detecting an attitude information of the photographing section;

wherein the embedding section embeds the attitude information from the attitude sensor into an image.

16. The image processing apparatus according to claim 10, wherein the embedding section embeds the tracking data into a header area of each image.

17. The image processing apparatus according to claim 10, wherein the embedding section embeds the tracking data into a manual setting area of each image, and the manual setting area is set on a screen manually.

18. The image processing apparatus according to claim 10, wherein the embedding section embeds the tracking data into an autosetting area of each image, and the autosetting area is set based on the point arrangement statistic.

19. The image processing apparatus according to claim 10, further comprising:

an inputting section for inputting the plurality of continuous images sequentially in which the tracking data was embedded;

a relative orientation section for performing a relative orientation to stereo-pair images selected by the tracking data in the images from the inputting section;

a connective orientation section for connecting a coordinate system between stereo-pair images and other stereo-pair images; and a three-dimensional measuring section for measuring three-dimensional coordinates of points included in the tracking data in the coordinate system connected by the connective orientation section.

20. The image processing apparatus according to claim 19, further comprising:

a single photo orientation section for orientating a relationship between image coordinates of points included in the tracking data and three-dimensional coordinates of the points by using a collinear conditional formula or the Direct Linear Transformation (DLT) method to a single image input by the inputting section.

\* \* \* \* \*